United States Patent
Mohamed (10) Patent No.: US 10,650,637 B2
(45) Date of Patent: May 12, 2020

(54) ELECTRONIC GAMING METHOD

(71) Applicant: Aly Said Mohamed, Middle Village, NY (US)

(72) Inventor: Aly Said Mohamed, Middle Village, NY (US)

(*) Notice: Subject to any disclaimer, the term of this patent is extended or adjusted under 35 U.S.C. 154(b) by 50 days.

(21) Appl. No.: 16/105,949

(22) Filed: Aug. 20, 2018

(65) Prior Publication Data

US 2019/0057575 A1 Feb. 21, 2019

Related U.S. Application Data

(60) Provisional application No. 62/548,281, filed on Aug. 21, 2017.

(51) Int. Cl.
*A63F 9/24* (2006.01)
*G07F 17/32* (2006.01)
*A63F 13/795* (2014.01)
*A63F 13/792* (2014.01)

(52) U.S. Cl.
CPC ........ *G07F 17/3255* (2013.01); *A63F 13/792* (2014.09); *A63F 13/795* (2014.09); *G07F 17/329* (2013.01); *G07F 17/3272* (2013.01)

(58) Field of Classification Search
None
See application file for complete search history.

(56) References Cited

U.S. PATENT DOCUMENTS

| | | | | |
|---|---|---|---|---|
| 6,980,962 B1* | 12/2005 | Arganbright | ........... | G06Q 30/02 705/14.23 |
| 8,272,950 B2* | 9/2012 | Rosenau | ................. | G07F 17/32 463/16 |
| 9,662,566 B1* | 5/2017 | Chyou | ................ | G06Q 30/0275 |
| 9,873,040 B1* | 1/2018 | Kim | ........................ | A63F 13/47 |
| 2004/0081942 A1* | 4/2004 | Resnick | ............... | G06Q 20/108 434/107 |
| 2005/0014558 A1* | 1/2005 | Estey | ................... | G07F 17/3237 463/29 |
| 2009/0138342 A1* | 5/2009 | Otto | ........................ | G06N 5/025 706/45 |
| 2011/0130197 A1* | 6/2011 | Bytnar | .................... | G07F 17/32 463/25 |
| 2013/0079149 A1* | 3/2013 | Fletcher | ................. | G06Q 50/01 463/42 |
| 2013/0185218 A1* | 7/2013 | Hermsdorff | ........ | G06Q 10/1053 705/321 |
| 2015/0088289 A1* | 3/2015 | Robbins | .............. | G07F 17/3276 700/91 |
| 2016/0042607 A1* | 2/2016 | McCoy | ............... | G07F 17/3255 463/25 |
| 2017/0358027 A1* | 12/2017 | Chrapko | ................ | G06Q 50/01 |
| 2018/0280806 A1* | 10/2018 | Otomo | .................. | A63F 13/795 |

* cited by examiner

*Primary Examiner* — Sunit Pandya
(74) *Attorney, Agent, or Firm* — Bruce A. Lev (57) ABSTRACT

A new investment-type of online game and/or software app that guarantees a payoff of $500.00 a month from a small, one-time initial investment and compliance of the rules. The payoff odds may increase incrementally the more one recruits others to play the game to provide consumers a new and exciting game that increases the opportunities for financial improvement in today's uncertain economy.

9 Claims, 12 Drawing Sheets

GAME ICON

ELECTRONIC GAMING METHOD

CROSS-REFERENCE TO RELATED APPLICATION

The present application is related to and claims priority from prior provisional application Ser. No. 62/548,281, filed Aug. 21, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of online gaming and more specifically relates to a new investment-type mobile "app" game having hierarchical team gameplay 29 for an overall goal of winning $500.00 a month, from a minimal initial investment.

2. Description of the Related Art

Millions of American's regularly enjoy testing their luck with the purchase of a lottery ticket. A fun and novel game of chance, lottery tickets are produced in a range of themes, method-of-plays, designs, sizes and cost. In particular, instant, or "scratch-off" lottery tickets, as well as those utilized when playing random games like Pick-3, Pick-4, and Powerball are extremely popular with consumers from all walks of life. Sponsored by individual states, lotteries are not only fun to play, but they can be very beneficial to local and state-run organizations. Specifically, the vast majority of generated lottery revenue typically goes to the development of schools and the funding of educational programs. In fact, in 2014, the Ohio Lottery allocated a staggering $637 million dollars to sponsor school programs. In South Carolina, earnings from the South Carolina State Lottery generated $150 million in projected profits, money which will be paid for 2,000 college scholarships for every student with a B average, as well as provide technology grants to public schools. Great for the state, for those who responsibly play instant lottery games, laying down a minute number of bills on an instant ticket can result in prizes ranging from a few dollars to several million.

Various attempts have been made to solve problems found in gaming activity art. Among these are found in: U.S. Pat. No. 8,229,755 to David A. Felice; U.S. Pat. No. 7,094,154 to Jason B. Kellerman; and U.S. Publication No. 2008/0033734 to George Dorman Carry. This prior art is representative of online membership gaming sites for entertainment purpose.

None of the above inventions and patents, taken either singly or in combination, is seen to describe the invention as claimed. Thus, a need exists for a reliable method of electronic gaming. The present invention is known as "The 500 Game" and will provide consumers a new and exciting game that increases the opportunities for financial improvement in today's uncertain economy and to avoid the above-mentioned problems.

BRIEF SUMMARY OF THE INVENTION

In view of the foregoing disadvantages inherent in the known methods for electronic gaming, the present invention provides a novel "500 Game". The general purpose of the present invention, which will be described subsequently in greater detail, is to provide a method of using a new investment-type of online game and/or software app to improve the opportunities for financial gain while interacting with other users on gaming software for its user(s).

Online gaming has become a fun and appealing means to interact with others in a virtual environment. Potentially financially beneficial online games have been shown to be extremely appealing to many people. User's often desire spending their time playing games that are creative and addictive.

As the name implies, The 500 Game is essentially a new investment-type game that guarantees a payoff of $500.00 to a winner, pooling from a plurality of user's initial investments. The payoff odds increase incrementally the more a user recruits others to play the game. The 500 Game is offered, for entertainment purposes, via an online outlet or software application. The 500 Game comprises gaming software which provides a means for a plurality of players to play a game over a computer network.

The present invention holds significant improvements and serves as a novel method of electronic gaming. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, The 500 Game, is constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an electronic gaming method and more particularly provide new investment-type of online game and/or software app that guarantees a payoff of $500.00 a month from a small, one-time initial investment and compliance of the rules, with the payoff odds increasing incrementally the more one recruits others to play the game to provide consumers a new and exciting game that increases the opportunities for financial improvement in today's uncertain economy.

Generally speaking, the present invention is a 2D game of chance and cunning where each player has the opportunity to win $500 (USD) by convincing other players to join their team or staff. Each player is part of a hierarchical structure where they are at a specific level but are also part of a team. The player wins when they reach the top position in the game hierarchy. Players can lose team or staff members and/or gain them by convincing and offering them advanced levels within their hierarchy which may propel their status within the game hierarchy. The 500 Game is offered, for entertainment purposes, via an online outlet or software application. In the following paragraphs like designations denote like elements. The terms "member" and "player" within the context of this description mean the same thing.

Figure 4:
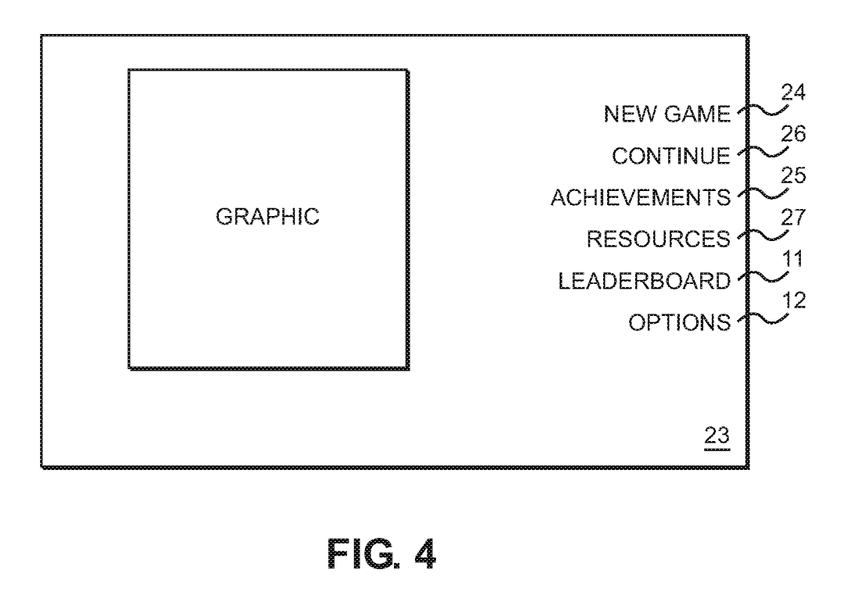
FIG. 4 is a Main Menu screen according to an embodiment of the present invention of FIG. 1.
Figure 7:
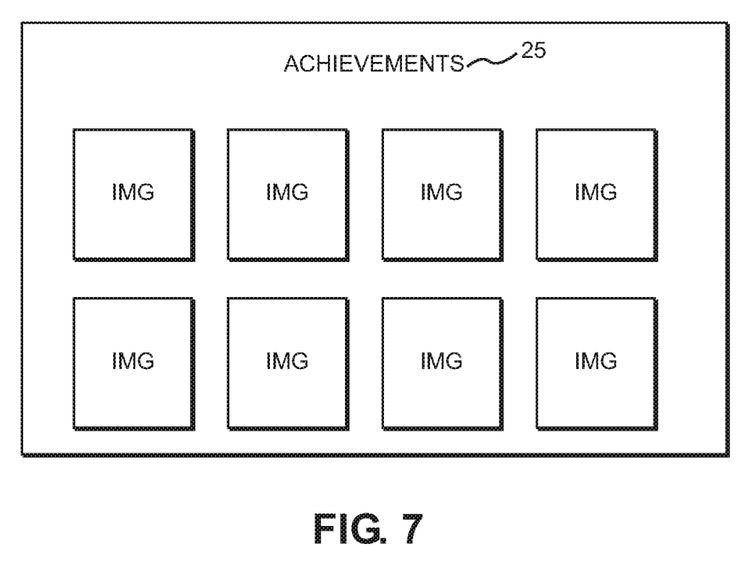
FIG. 7 is an Achievements screen according to an embodiment of the present invention of FIG. 1.
Figure 11:
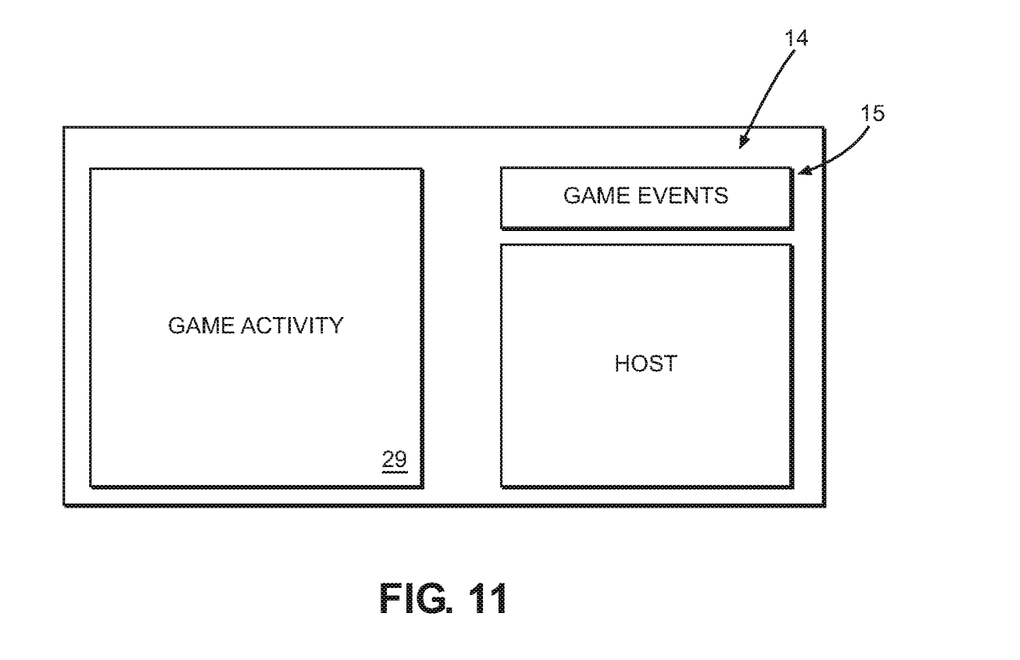
FIG. 11 is a Gameplay screen according to an embodiment of the present invention of FIG. 1.

The gaming software 3 aims to achieve the following goals: Establish The 500 Game 1 universe and familiarize players 4 with the rules surrounding The 500 Game 1 as shown in FIG. 4, as well as with the potential winnings associated with the game; Serve as a prototype and first level implementation of the game; Develop an achievements 25 system as shown in FIG. 7, that rewards the player 4 when they successfully play the game; Develop a fun gameplay as shown in FIG. 11, based on discovery, advancement, and power; and have art and design that are faithful to The 500 Game 1 style.

Figure 2:
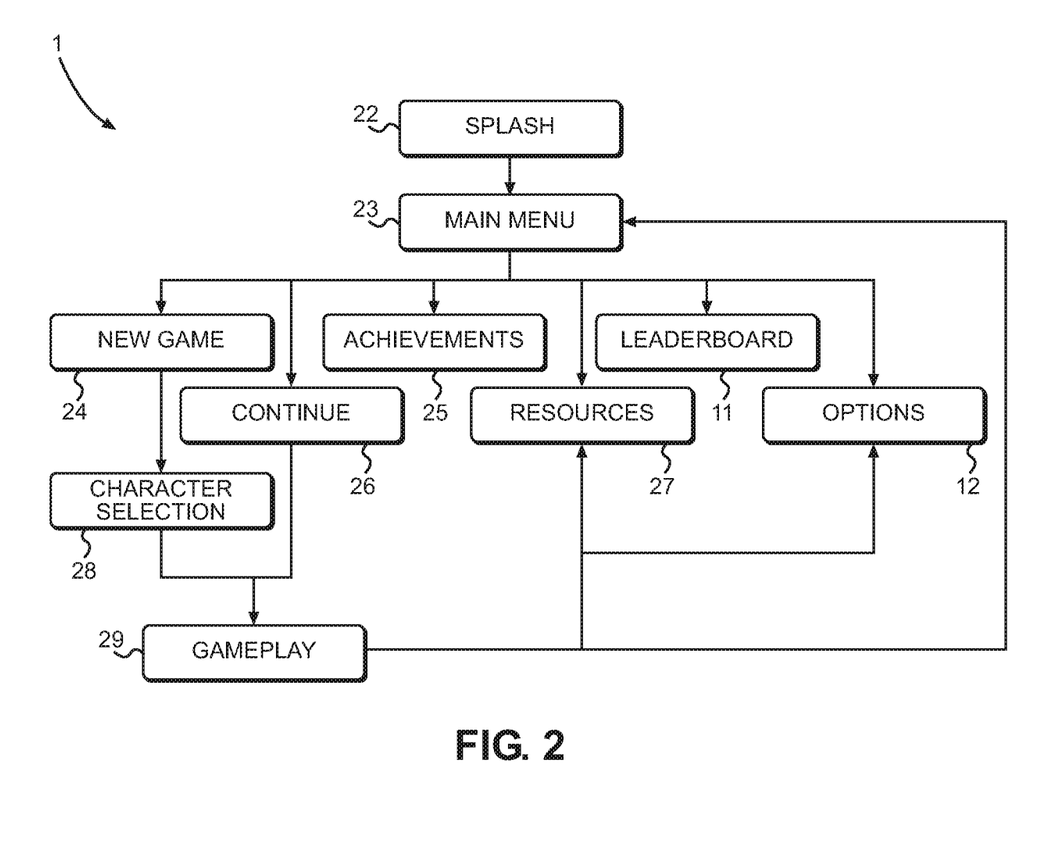
FIG. 2 is a flowchart according to an embodiment of the present invention of FIG. 1.
Figure 3:
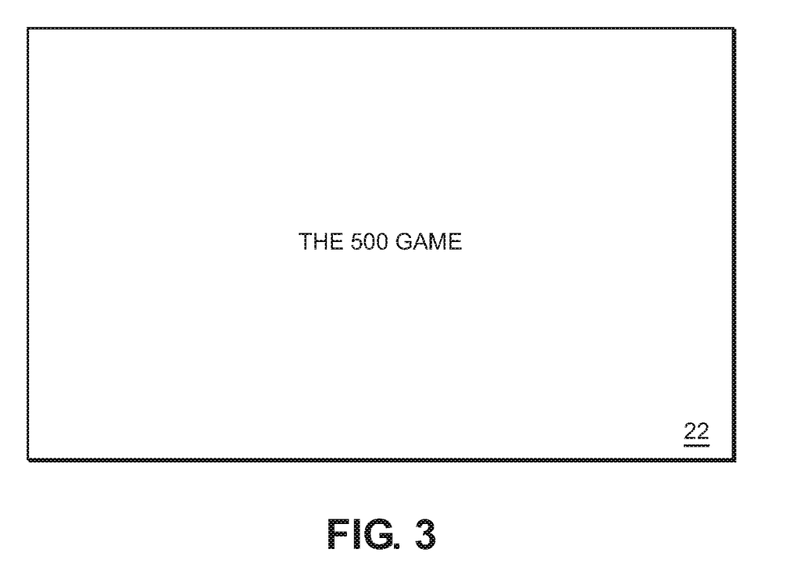
FIG. 3 is a Splash Page screen according to an embodiment of the present invention of FIG. 1.
Figure 14:
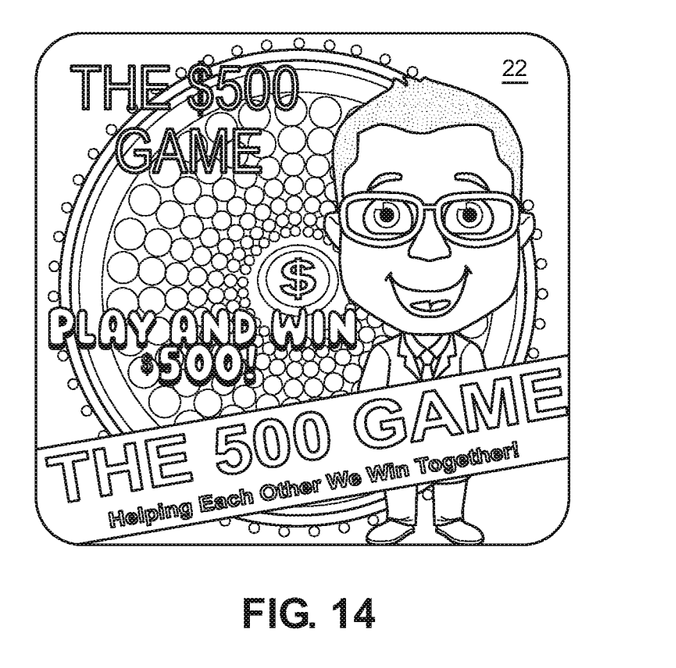
FIG. 14 is a graphic image of the Splash screen according to an embodiment of the present invention of FIG. 1.
Figure 15:
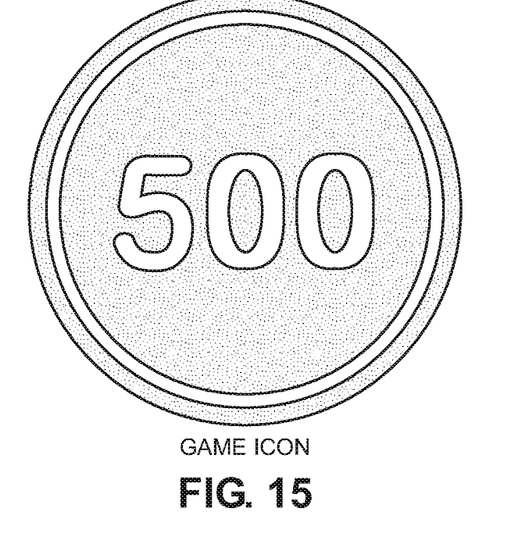
FIG. 15 is a Game Icon screen according to an embodiment of the present invention of FIG. 1.

FIG. 2 generally shows the progression of screens that a player 4 will see once the game begins. FIGS. 3 and 14 generally illustrate a Splash Page 22 which will be the first page a user sees as an introduction to the game before being given the option to continue 26 to the main content of the site.

Figure 5:
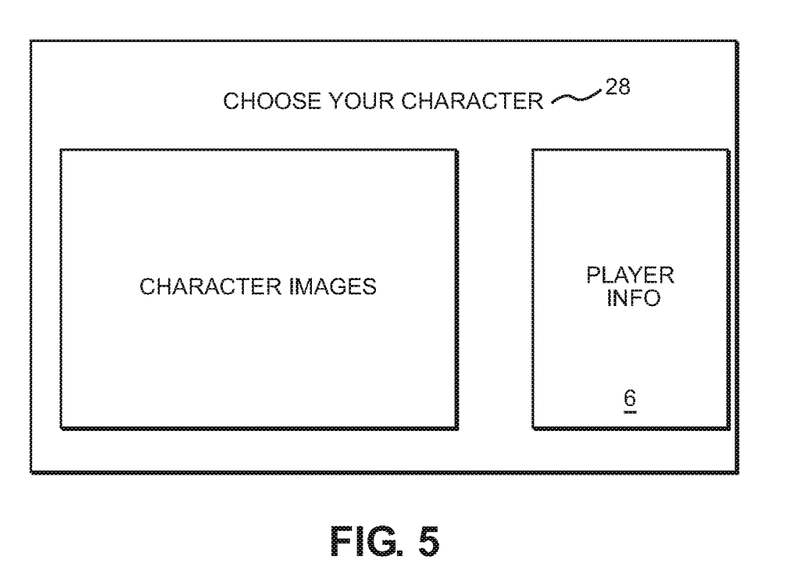
FIG. 5 is a Character Selection screen according to an embodiment of the present invention of FIG. 1.
Figure 6:
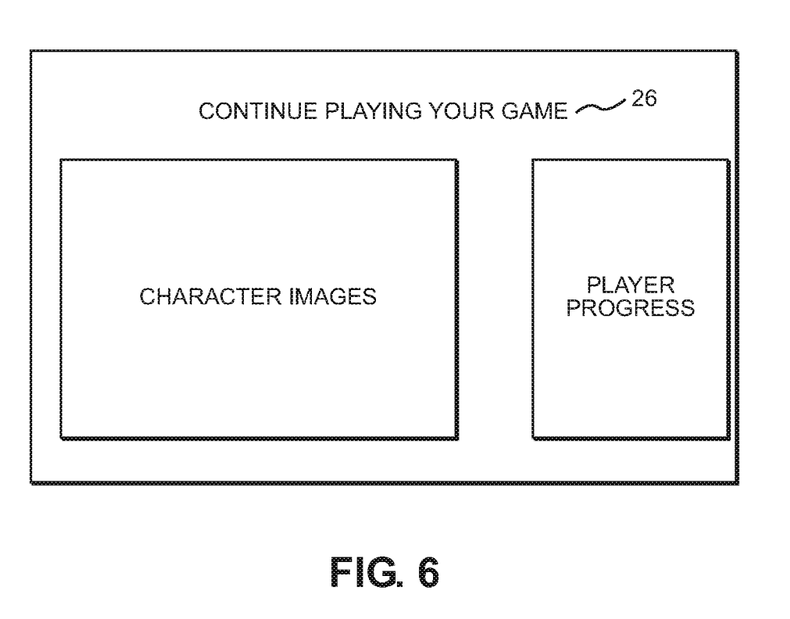
FIG. 6 is a Continue screen according to an embodiment of the present invention of FIG. 1.
Figure 8:
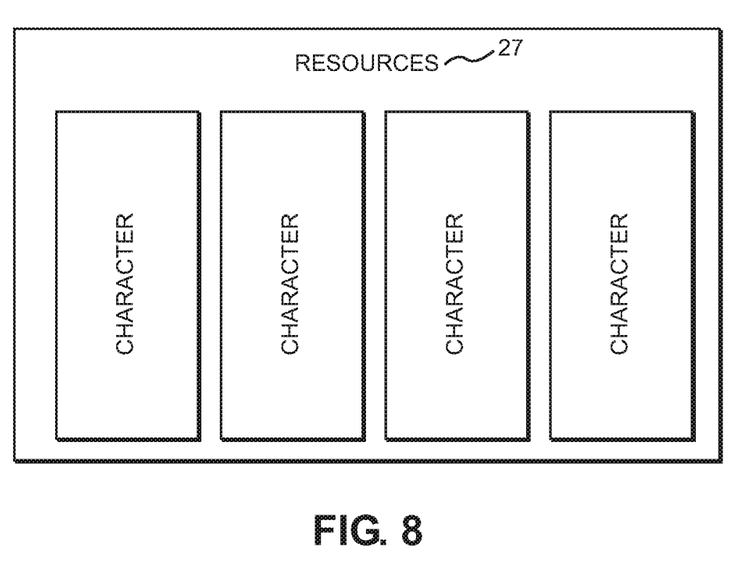
FIG. 8 is a Resources screen according to an embodiment of the present invention of FIG. 1.

Gameplay 29 of the present invention includes discovering a storyline, new levels, as well as the several achievements 25 and prizes. A player 4 creates playable characters as shown in FIG. 5 and FIG. 8, which are resources 27 and able to advance in levels and become stronger within the game until there is a winner 16. The ultimate goal of the gameplay 29 is to advance and win via creating a strategic advantage and leverage over other players 4 as shown in FIG. 6.

Figure 1:
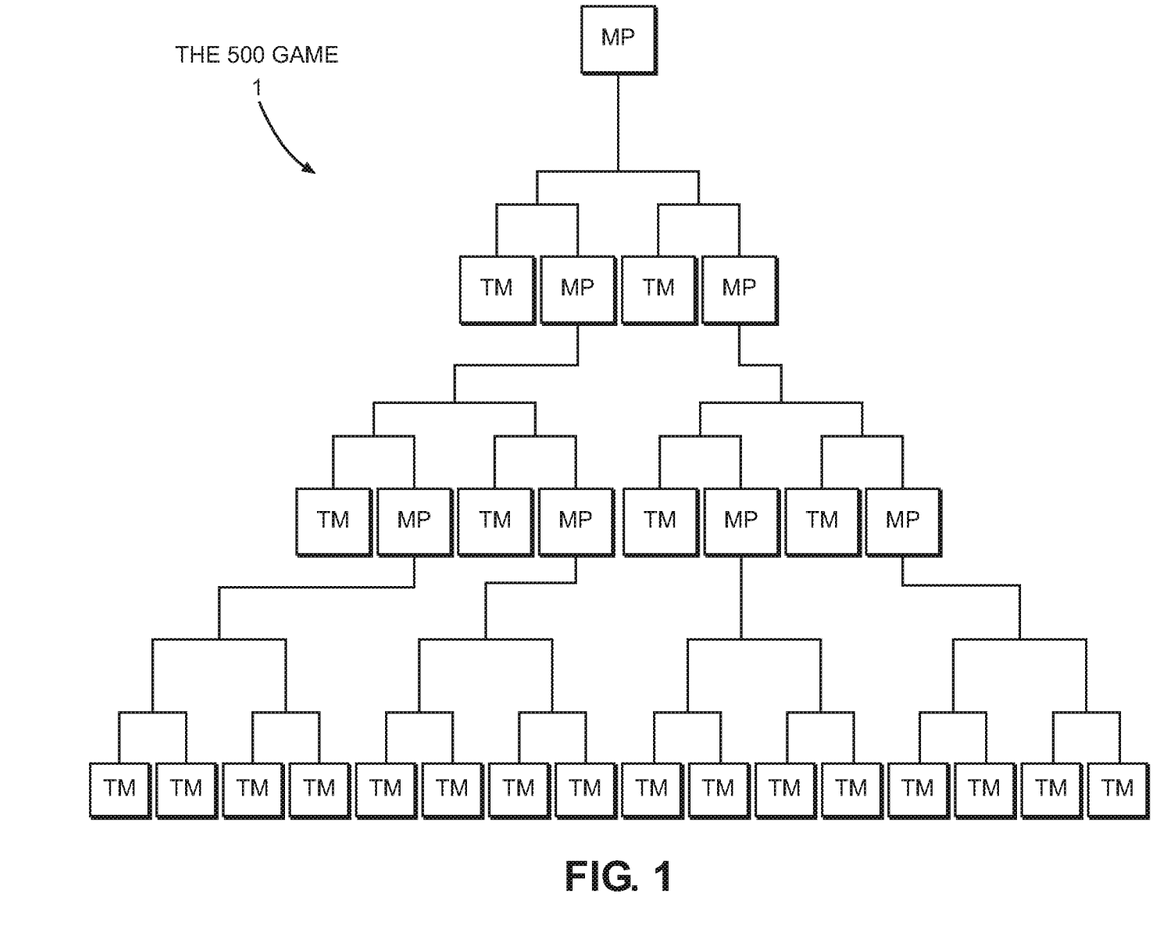
FIG. 1 shows a game hierarchy block diagram according to an embodiment of the present invention.

The gaming software 3 is an entertaining take on a geometric progression model as generally shown in FIG. 1, which shows a familiar representation of a heirarchy style gaming setup. In that model a player compels individuals who wish to win to join their team by making a payment. In exchange, the player promises its new team members an opportunity to be the next player to be victorious within the total game hierarchy. One can easily confuse the strategy of the game with the 8-Ball model. The difference is that ancillary players and competitors are only promised the chance to win or lose and there are circumstances beyond the player's control that can also impact the outcome making it impossible for any player to effectively control the outcome without a certain level of eventuality.

A player 4 who has recruited 8 other players 4 to compete within the gaming software 3 and is an active player 4 is called a Main Player MP as seen in FIG. 1. A player 4 who has been recruited 8 by a Main Player MP is a Team Member TM. An Enemy Player is any player 4 competing that is not the Main Player MP and inclusive to that Main Player's own Team Members TM that they recruited.

Figure 17:
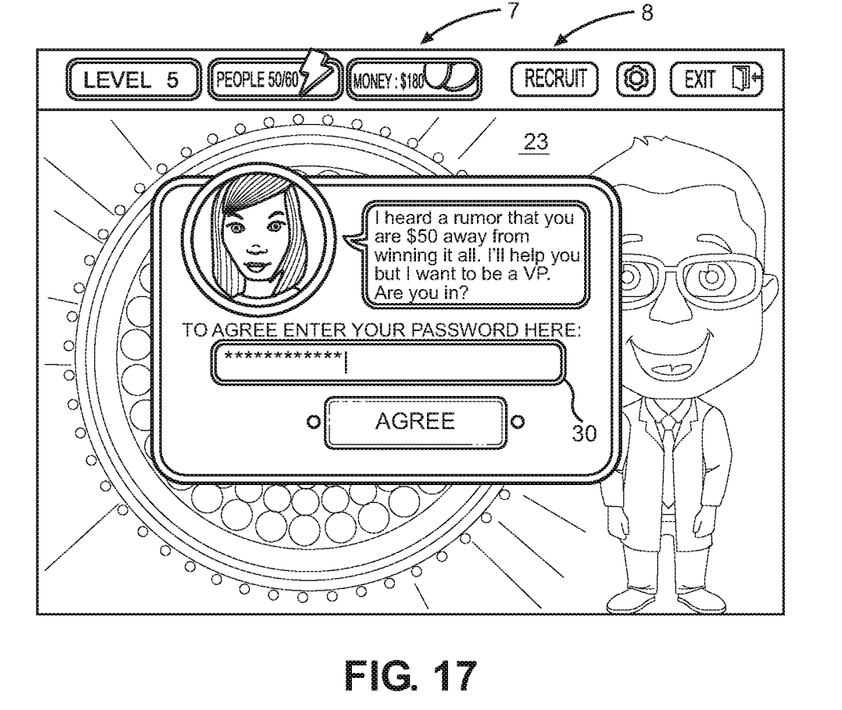
FIG. 17 is a password screen according to an embodiment of the present invention of FIG. 1.

A player 4 logs onto the gaming software and creates a unique profile 6 and character selection 28 as illustrated in FIG. 5. The profile 6 includes a username and password 30 as shown in FIG. 17. A player 4 is also prompted to securely enter payment information (credit card, bank account number, PayPal account, etc.). With a profile 6 and payment information entered into the gaming software 3, a player 4 can initiate gameplay 29. Also, an initial investment of $100.00 is drawn from a player's financial account via the payment information prior to gameplay 29.

Figure 10:
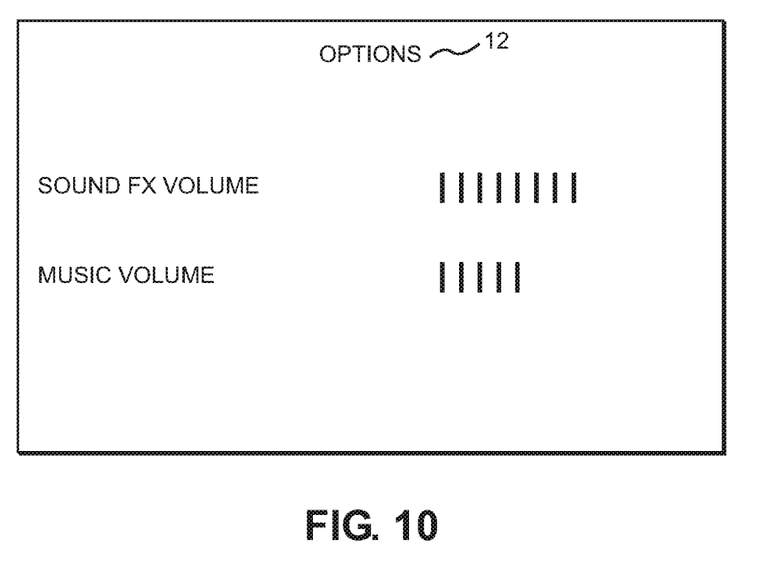
FIG. 10 is an Options screen according to an embodiment of the present invention of FIG. 1.

The gaming software 3 provides an art style that resembles a television game show as shown in FIGS. 13, 14, 16 and 17. The style reflects the fact that players 4 can actually win real sums of money yet maintains a fun mood. The present invention also provides music and other audio within the gaming software as shown in FIG. 10, used to set the mood of the world as well as indicate a call to action for the player during gameplay 29 events. There are two clearly different music soundtracks. A basic gameplay 29 music loop that's not too fast, that is very minimal, and subtly layered with synthesizer textures and digital samples; and a 'Call to action' song loop that is faster, and has a rock feel.

The music is compressed as MP3 with a rate between 192 kbps, and 128 kbps, and consists of loops that can be cycled repeatedly.

Figure 16:
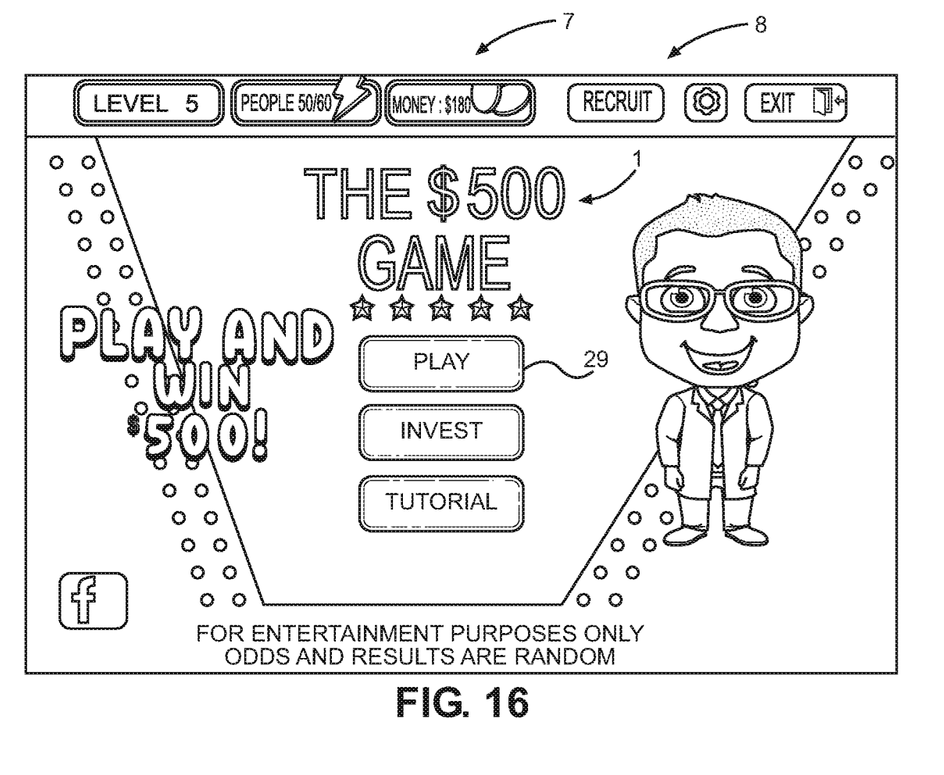
FIG. 16 is a user interface screen according to an embodiment of the present invention of FIG. 1.

The present invention provides GUI (Graphical User Interface) as shown in FIG. 16 interactions which are indicated with sounds for a Menu button, a Stats button, a Recruit button, and a Play Game button. FIG. 4 illustrates a general representation of what the main menu 23 looks like. The gaming software 3 uses special effects to indicate powerful actions and to establish the game's ambiance. The sound FX within the gaming software 3 enhances the gameplay 29 and clearly identifies game events. What takes place in the gaming software 3 is indicated with sound effects, such as the appearance of new team members TM, the departure of team members TM, and unfortunate events. The gaming software 3 is used on various platforms including but not limited to iOS, Web, and Android.

Figure 12:
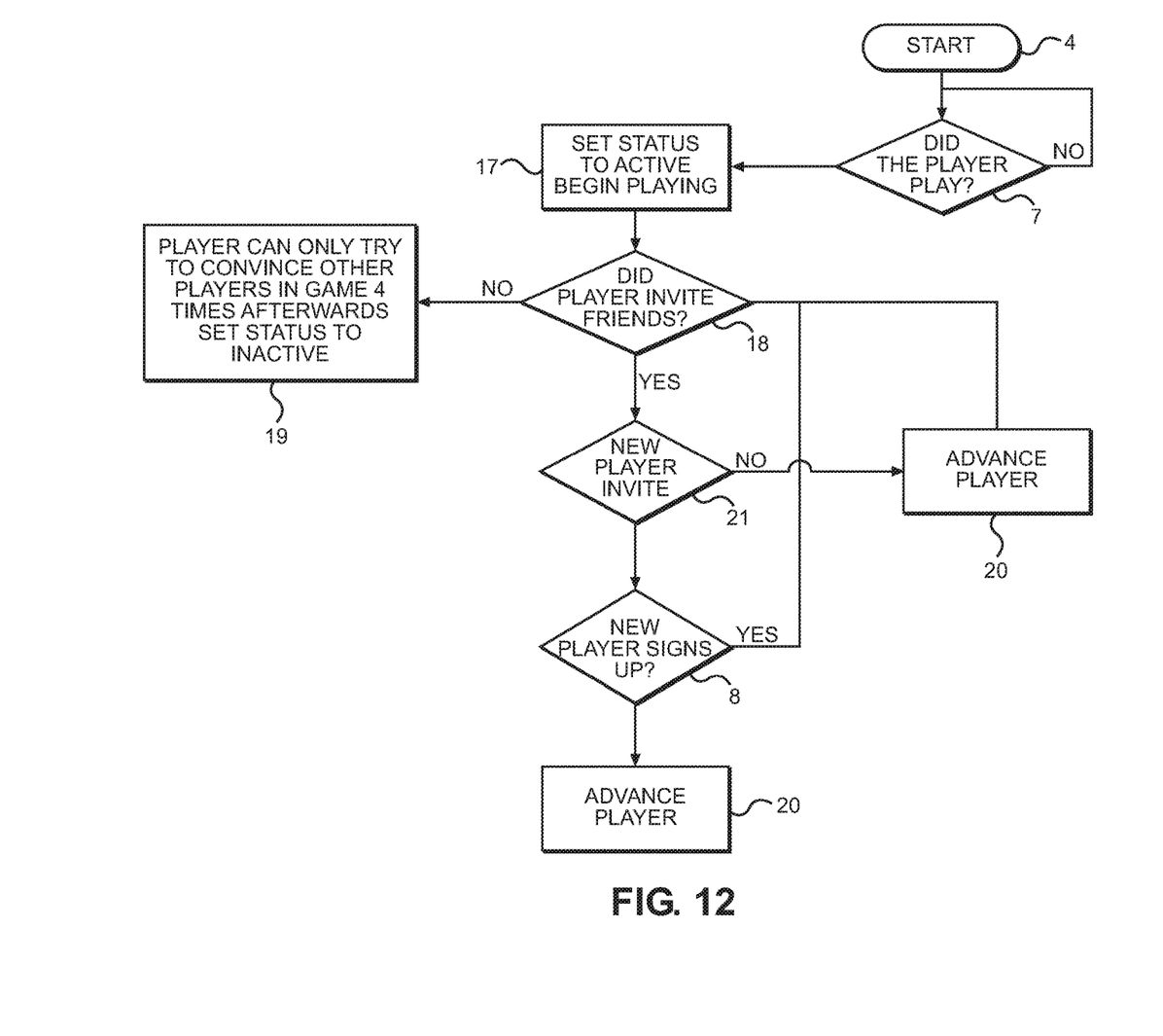
FIG. 12 is a flowchart of The 500 Game according to an embodiment of the present invention of FIG. 1.
Figure 13:
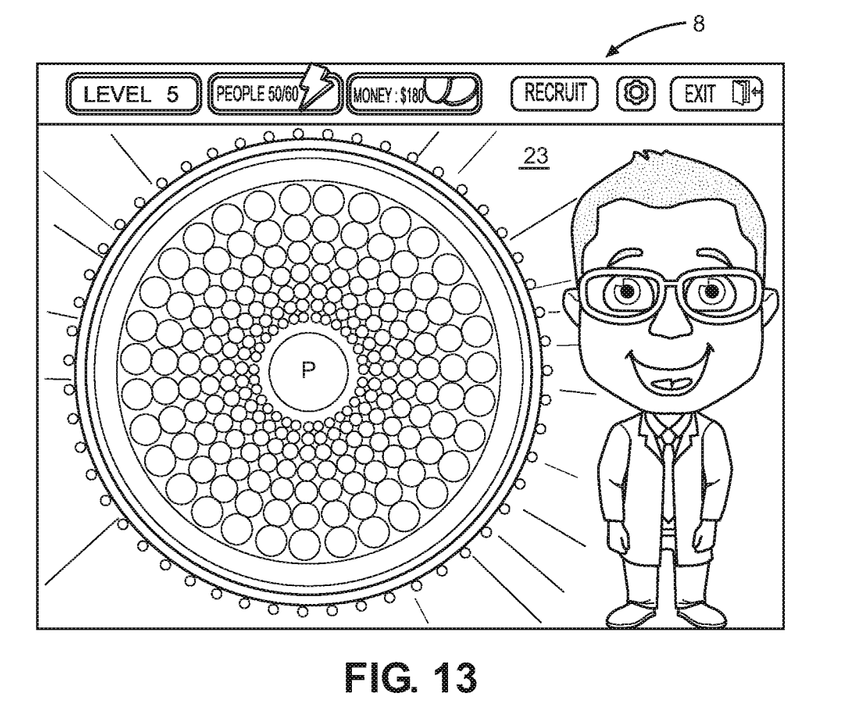
FIG. 13 is graphic image of the main menu screen according to an embodiment of the present invention of FIG. 1.

A flowchart, as shown in FIG. 12, shows the gameplay 29 of the gaming software 3. A player 4 is invited to join the game. The player 4 is asked to deposit money into the gaming account 7 at which time the status is set to active 17. The player 4 tries to recruit 8 other players 4N to play 18. The player 4 can only try to invite 21 and convince other players 4N four times. If the player 4 fails, the status is set to inactive 19. If the player 4 is successful, the player 4 advances 20 and invites 21 other players 4N. Each player 4 advances 20 based on the number of other players 4N, etc. . . . he or she can recruit 8. All actions and activities are logged within the relational database at the core of the gaming software system.

Another flowchart is shown in FIG. 2 which shows the 500 game 1 and the general progression of screens seen for a player 4. A player 4 will first see the Splash screen 22 then the Main menu 23. The Main menu 23 will allow the player to choose New game 24, Achievements 25, Leaderboard 11, Continue 26, Resources 27 or Options 12. From New game 24 the player 4 can progress to Character selection 28 and on to Gameplay 29. If the player 4 does not want to select a character, the player may proceed directly from Continue 26 to Gameplay 29. From Gameplay 29 a player 4 can access Resources 27 and Options 12 and also proceed back to the Main menu 23 if desired.

The 500 Game 1 utilizes a reverse geometric progression (i.e., 8, 4, 2, 1) to advance the game and create more users. Players 4 are also members 4 and the terms are used interchangably. As such, once a player 4 invests $100.00, he or she is now charged with bringing in at least one new member/player 4B, 4C, etc., and the house (or the security fund) will be the second player 4. This means every member 4 will have two players 4 to follow him/her. The member 4 will bring one player 4, and the house (security fund) will be the second one.

Every member 4 brings a member/player 4 within a certain timeframe with the hope to further advance to the next level. However, should the member 4 fail to recruit 8 other members 4N, he or she may run the risk of losing their initial payment of $100 automatically and be set to inactive status 19. The gaming software 3 provides opportunity for any player 4, but is also a game of chance and statistically creates unfortunate circumstances or adverse events 15 or opportunities 14 for any player 4, as randomly determined by the gaming software.

Figure 9:
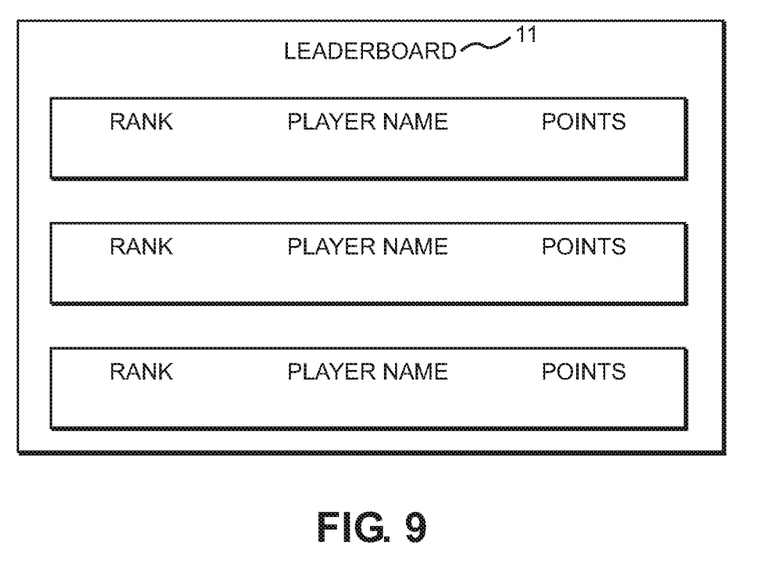
FIG. 9 is a Leaderboard screen according to an embodiment of the present invention of FIG. 1.

The gaming software includes a Leaderboard as shown in FIG. 9 to display the best results obtained by the member 4 and compares them to others that are also competing within the game. A member 4 invites new players 4N to join their team, recruits 8 active members 4N to join their team, or oppose other members 4N.

Figure 18:
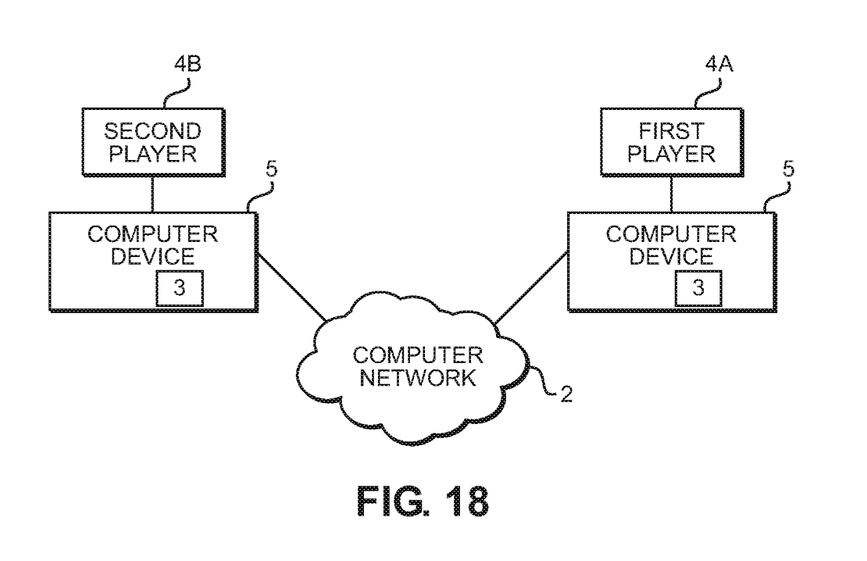
FIG. 18 is a flowchart illustrating the game setup according to an embodiment of the present invention of FIG. 1

A preferred method of playing the 500 Game 1 is providing a computer network 2 and providing a plurality of computer devices 5 as can be seen in FIG. 18, wherein each of the computer devices 5 are adapted to electronically connect with and communicate through the computer network 2. Gaming software 3 is provided and each of the computer devices 5 is encoded with the gaming software 3 which allows a plurality of players 4A, 4B, 4C etc . . . to interact with one another via the computer devices 5, the gaming software 3 and the computer network 2.

Figure 19:
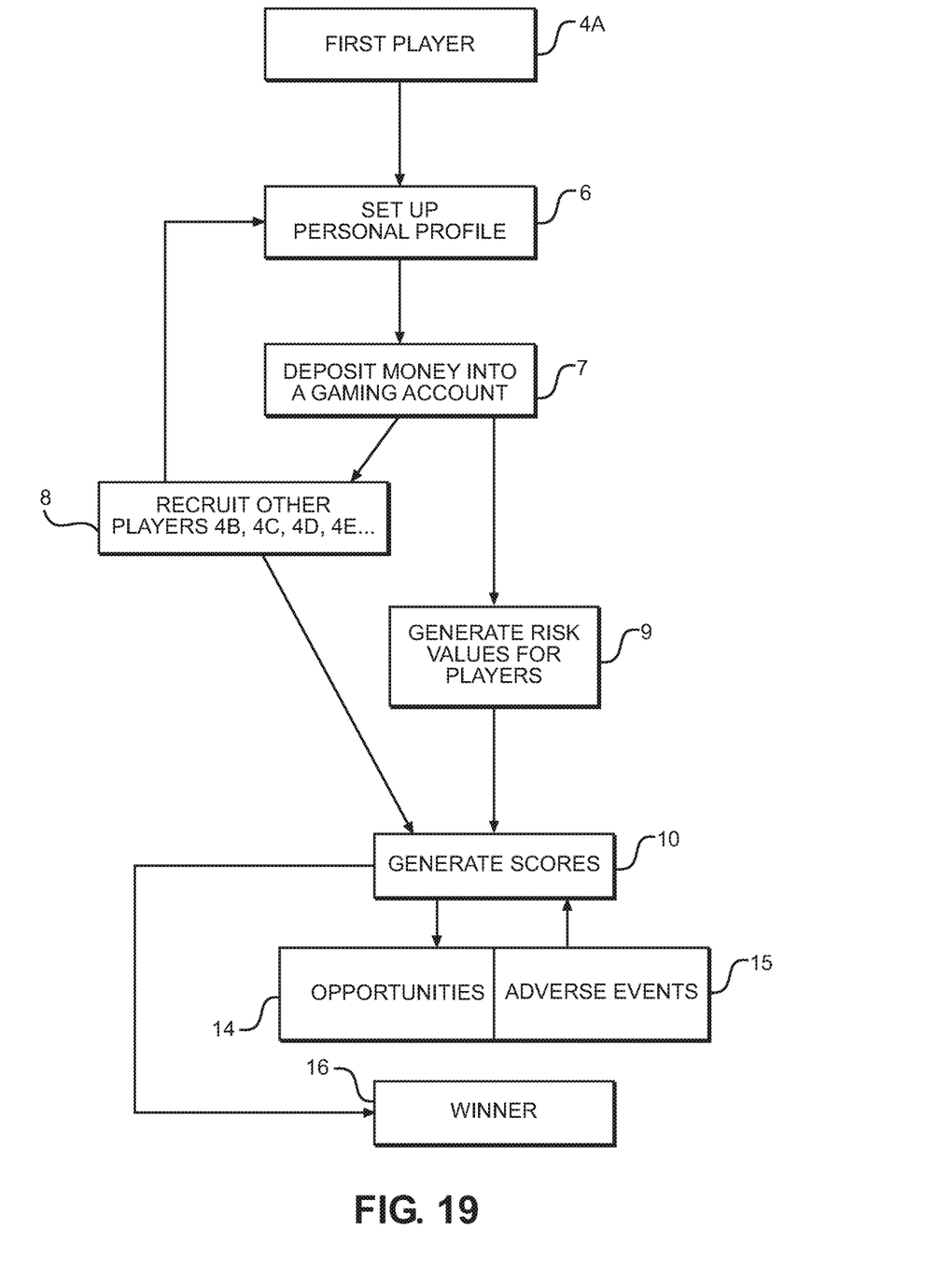
FIG. 19 is a flowchart illustrating gameplay according to an embodiment of the present invention of FIG. 1.

Turning to FIG. 19, as an example, a first player 4A sets up a personal profile 6 and deposits money into a gaming account 7. The first player 4A recruits 8 other players 4B, 4C etc . . . who also set up a personal profile 6 and deposit money into a gaming account 7. A second player 4B sets up a personal profile 6 and deposits money into a gaming account 7 and the second player 4B recruits 8 other players 4C, 4D . . . etc. The players 4N that the second player 4B recruits also deposit money into the gaming account 7. Random risks values 9 are generated and a score 10 is generated for the first player 4A based upon the number of players 4N (where 4N denotes more than one player) recruited by the first player 4A and a generated risk value 9. A score 10 is generated for the second player 4B based upon the number of players 4N recruited 8 by the second player 4B and a generated risk value 9.

The gaming software 3 is adapted to generate opportunities 14 and adverse events 15 that are further used to generate scores 10 of the first and second players 4A and 4B respectively. The opportunities 14 are adapted to increase the score 10 of a player 4. Adverse events 15 are adapted to decrease the score of a player 4. Additional value can be added to the scores 10 of players 4A and 4B for each other player 4N they recruit 8. At the culmination of the game, the scores 10 of the first and second players 4A and 4B respectively are compared and a winner 16 is determined.

The gaming software 3 is adapted to allow a plurality of players 4N to set up personal profiles 6 and to deposit money into respective gaming accounts 7 and to recruit 8 other players 4N. The gaming software 3 is also adapted to generate scores 10 for the other players 4N and to compare the scores 10 of the plurality of players 4N and determine a winner 16.

Ideally, the gaming software 3 will appeal to players 18 to 56 years old, having a IPad, Android Phone, or computer. A user will typically like mobile games, consume many types of content on their mobile devices, and purchase content through "apps" or online.

Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A method of playing an electronic game comprising the steps of:
   providing a computer network;
   providing a plurality of computer devices;
      wherein each of said computer devices is adapted to electronically connect with and communicate through said computer network;
   providing gaming software;
      wherein each of said plurality of computer devices is encoded with said gaming software; and
      wherein when said gaming software is executed on each of said plurality of computer devices, cause said plurality of computer devices to:
         have a plurality of players interact with one another via said computer devices, said gaming software, and said computer network;
         have a first player set up a personal profile;
         have said first player deposit money into a gaming account;
         have said first player recruit other players to join said electronic game;
         wherein said first player may lose said money deposited into said gaming account if said first player fails to recruit other players;
         have said other players deposit money into said gaming account;
         have a second player set up a personal profile;
         have said second player deposit money into said gaming account;
         have said second player recruit other players to join said electronic game;
         wherein said second player may lose said money deposited into said gaming account if said second player fails to recruit other players;
         have said second player invite other players deposit money into said gaming account;
         generate random risk values;
         generate a score for said first player based upon the number of other players recruited by said first player and a generated risk value;
         generate a score for said second player based upon the number of other players recruited by said second player and a generated risk value;
         compare said scores of said first and second players and determine a winner.

2. The method of playing an electronic game of claim 1, wherein said gaming software is further adapted to generate opportunities and adverse events that are further used by said gaming software to generate said scores of said first and second players.

3. The method of playing an electronic game of claim 2, wherein said opportunities are adapted to increase said score of said player.

4. The method of playing an electronic game of claim 2, wherein said adverse events are adapted to decrease said score of said player.

5. The method of playing an electronic game of claim 1, wherein said gaming software is further adapted to allow a plurality of other players to set up a personal profiles, allow said plurality of other players to deposit money into respective gaming accounts; and allow said plurality of other players to recruit other players; and wherein gaming software is further adapted to generate scores for each of said plurality of other players; and wherein gaming software is further adapted to compare said scores of said first, said second, and said plurality of other players and determine a winner.

6. The method of playing an electronic game of claim 5, wherein said gaming software is further adapted such that respective players receive additional value to their respective score for each recruited player recruited by a player that they recruited.

7. The method of playing an electronic game of claim 1, wherein said gaming software is further adapted to provide a leader board image upon a respective display screen of each said computer device.

8. The method of playing an electronic game of claim 1, wherein said gaming software is further adapted to provide input screens and options upon a respective display screen of each said computer device.

9. The method of playing an electronic game of claim 1, wherein said input screens are adapted to allow each player to input chosen information about themselves to be displayed on respective display screens of each said computer device.

* * * * *